United States Patent [19]

Black

[11] 4,187,999
[45] Feb. 12, 1980

[54] VERTICAL ASCENDING AND DESCENDING AIRPLANE

[76] Inventor: John O. Black, 9607 Sturgeon Valley Rd., Vanderbilt, Mich. 49795

[21] Appl. No.: 901,209

[22] Filed: Apr. 28, 1978

[51] Int. Cl.$^2$ ............................................. B60V 3/08
[52] U.S. Cl. ............................. 244/12.5; 244/23 D; 244/100 R; 180/126
[58] Field of Search ............... 244/12.1, 12.3, 12.4, 244/12.5, 23 R, 23 A, 23 B, 23 D, 36, 100 R, 100 A, 6; 180/126

[56] References Cited

U.S. PATENT DOCUMENTS

| 1,910,098 | 5/1933 | Ellis | 244/12.5 |
| 2,115,285 | 4/1928 | Ruderman | 244/12.1 |
| 3,248,877 | 5/1966 | Alderson et al. | 244/12.5 |
| 3,330,500 | 7/1967 | Winborn | 244/12.5 |
| 3,454,238 | 7/1969 | Goodson | 244/12.3 |
| 3,462,100 | 8/1969 | De Valroger | 244/100 R |
| 3,486,577 | 12/1969 | Jackes | 244/12.1 |

FOREIGN PATENT DOCUMENTS 381538  12/1956  Denmark ................................. 244/12.5

Primary Examiner—Galen L. Barefoot
Attorney, Agent, or Firm—Harness, Dickey & Pierce

[57] ABSTRACT

The airplane of the present invention is of the vertical take-off and landing type powered by one or more jet engines which are mounted to provide thrust necessary for horizontal flight, movable panels direct exhaust gases downwardly toward the ground to provide a ground effect for greater safety upon vertical take-off and landing.

4 Claims, 4 Drawing Figures

4,187,999

VERTICAL ASCENDING AND DESCENDING AIRPLANE

BACKGROUND OF THE INVENTION

Several types of vertically operated airplanes driven by turbo-jet engines have been developed and a number of these have been destroyed when attempting a vertical landing. The use of hingeable panels for confining the downwardly directed exhaust gases from a helicopter is shown, described and claimed in applicant's U.S. Pat. No. 4,032,084 and the art cited therein. The application of the panels to direct engine exhaust is believed to substantially increase the safety of vertical take-off and landing aircraft.

SUMMARY OF THE INVENTION

The airplane of the present invention is of the type which is capable of effecting a vetical take-off and landing with one or more turbo-jet engines. The aircraft has incorporated therein hinged panels for confining the exhaust gases within an area defined by the panels to provide a landing cushion or "ground effect" upon descent of the airplane to the ground. The airplane is provided with conventional wheels so it can be moved about and on which the landing occurs with the wheels located out of the direct path of the exhaust gases.

DESCRIPTION OF THE PREFERRED EMBODIMENTS

Figure 1:
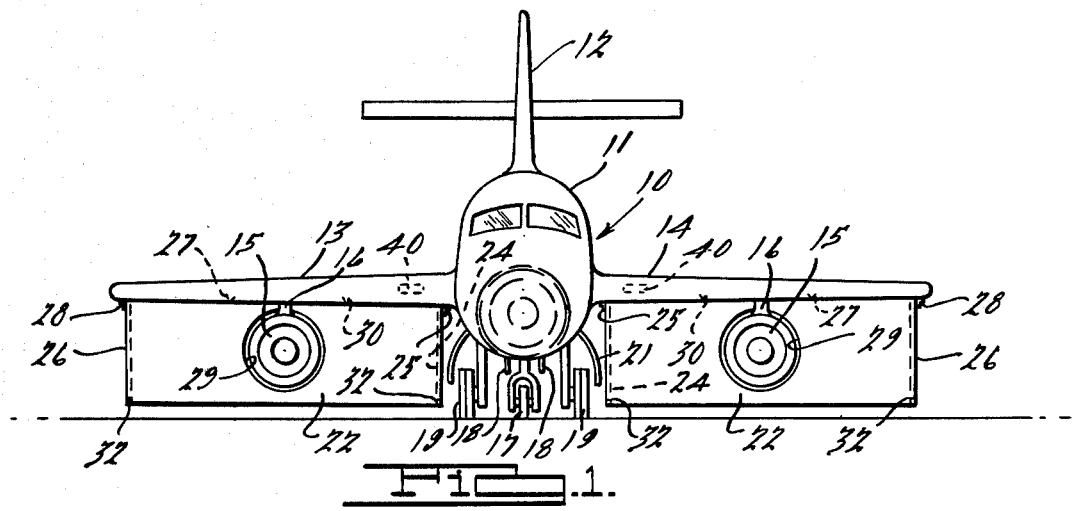
FIG. 1 is a front view of an airplane having a turbo-jet engine on each wing surrounded by hinged panels which confine the exhaust gases and direct them toward the ground.
Figure 2:
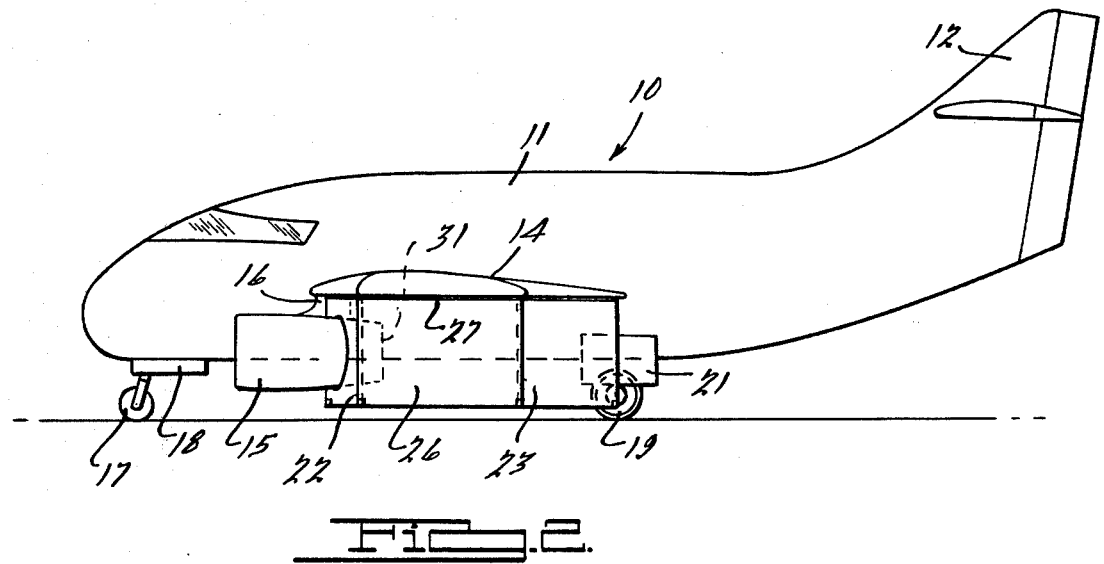
FIG. 2 is a view in side elevation of the structure of FIG. 1 with the hinged panels lowered about the exhaust end of the engines.

In FIGS. 1 and 2, a vertical ascending and descending airplane 10 is illustrated having a fuselage 11, tail structure 12 and oppositely extending wings 13 and 14. Turbo-jet engines 15 are supported on the wings by suitable elements 16. A front wheel 17 is retractable within the fuselage to an area enclosed by a pair of flaps 18 in the conventional manner. A pair of wheels 19 are disposed near the bottom center of the fuselage which are movable thereinto and enclosed by flaps 21. This follows the standard construction for airplanes, the parts of which have been modified in view of the vertical ascent and descent and the horizontal operation of the present airplane.

To provide the power for raising and lowering the airplane from the two engines 15 supported on the wings 13 and 14, the four panels are hinged to the underside of the wings in overlapping relation. The front panel 22 is hinged within a wing recessed area and is covered by a rear panel 23 which is hinged downwardly to provide the rear wall which is substantially the same size as the wings of the enclosure. The side panel 24 is hinged at 25 at a point located adjacent to the fuselage from which the free end swings downwardly. The fourth panel 26 is hinged at 28 at the outer edge of the wings with the free end located at the point 27 from which it swings downwardly. The panels are supported on the underside of each wing and surround the engine 15 on the wing when lowered.

The front panels 22 have a circular opening 29 which permits the panels to extend over the exhaust ends 31 of the engines. The ends of the downwardly hinged panels are located closely adjacent to the ground so as to confine the exhaust gases from the two engines within the area enclosed by the four panels and which becomes more effective when the airplane is near the ground. The panels are operated by suitable motors 40 when the take-off or landing is to take place so that they can be latched at 32 at the corners when lowered and latched at 30 when covering the underside of the wings during horizontal flight. The operating motors 40 are similar to those which raise and lower the landing gear, flaps and the like.

Figure 3:
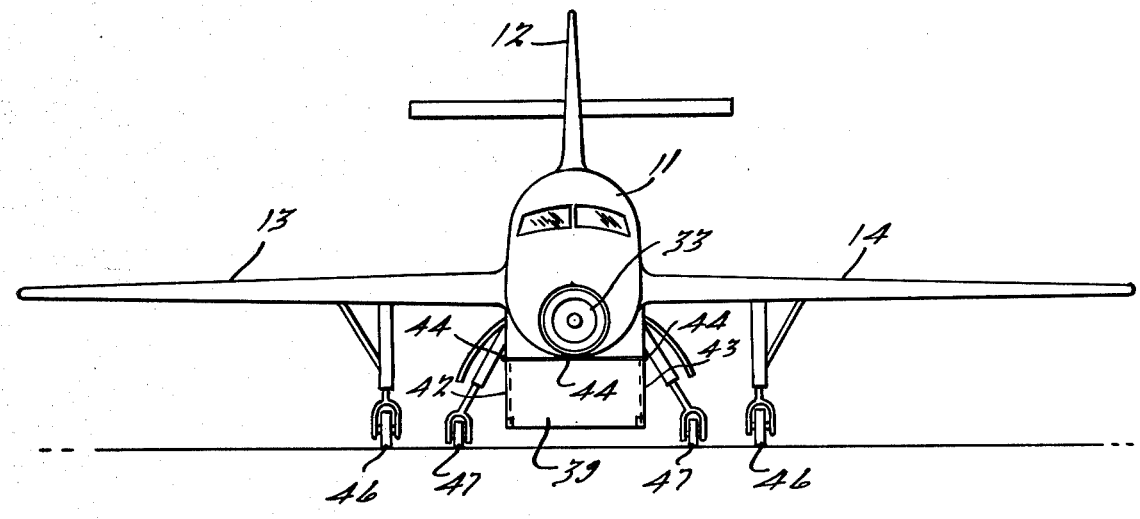
FIG. 3 is a front view of an airplane similar to that illustrated in FIG. 1 with a single engine at the lower part of the fuselage.
Figure 4:
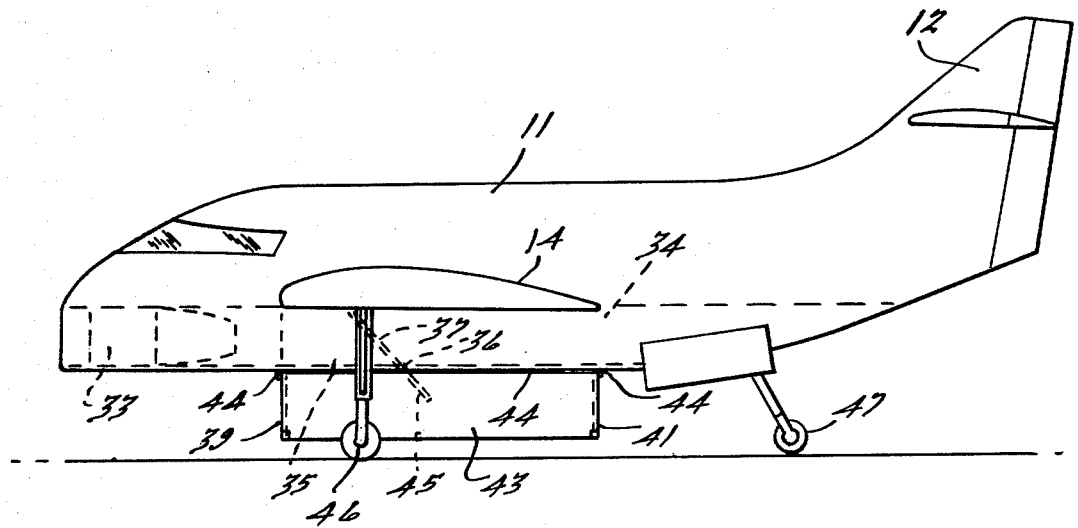
FIG. 4 is a side view of the structure illustrated in FIG. 3.

A similar ground effect is obtained by the airplane illustrated in FIGS. 3 and 4 having a single engine 33. Exhaust gases pass from the front to the rear end in a passageway 34 located at the bottom of the fuselage. The engine 33 is mounted at the front end of the fuselage and the passageway 34 to provide a normal flow of the exhaust gases to the rear end of the airplane. When taking off or landing vertically, a section 35 of the passageway 34 is hinged at 36 to permit the portion 37 to swing upwardly to cut off the rear portion of the passageway and to deflect exhaust gases from the engine 33 downwardly into an area 38 formed by a front panel 39, a rear panel 41 and two side panels 42 and 43.

The panels are hinged along the lines 44 with the forward and rearward panels 39 and 41 hinged upwardly ahead of the side panels 42 and 43 which close the bottom of the fuselage. When the panels are lowered, the exhaust gases strike the separated portion 37 and the portion 45 hinged therewith and accumulate in the area encompassed by the panels. The cushion formed by the directed gases permits the airplane to vertically ascend and descend relative to the ground. Front wheels 46 are enclosed in areas within the wings while a pair of tail wheels 47 are hinged into the bottom of the fuselage on each side of the exhaust passageway 34. Thus, the engine 33 is effective for providing vertical lift to the airplane from the ground and thereafter, by returning the sections 35 to normal positions, to open the passageway, permit the engine to propel the aircraft horizontally. Panels 39, 41 42 and 43 are rotated to close the bottom opening of the fuselage. Latching means are provided for the panels when in both positions and motor means for their operation are employed as noted above.

What is claimed is:

1. In an airplane construction containing a fuselage and a pair of wings which aids in vertical ascent and descent and horizontal flight, a turbo-jet propulsion means beneath each said wing mounted for horizontal propulsion, and panels hinged to the underside of each said wing to form substantially rectangular areas at the discharge end of the engine, the panels are dimensioned to extend downwardly from said underside of each wing to substantially the level of the ground on which said airplane rests for confining the exhaust gases therefrom within said areas to provide pressurized confined cushions which engage the ground.

2. In an airplane construction as recited in claim 1, wherein a pair of said turbo-jet engines are provided, means for mounting one engine on each of the wings, and a plurality of said panels hinged at the edges of and covering the undersurface of each wing which when dropped downwardly in vertical position form said confined substantially rectangular areas in which the exhaust gases from the engines are collected.

3. In an airplane construction as recited in claim 2, wherein four of said panels are nested beneath each wing hinged adjacent to the front and rear edges, the fuselage and outer wing ends which form said rectangular areas.

4. In an airplane construction as recited in claim 3, wherein the front panels are provided with an opening through which the exhaust end of the engines extend when the front panels are lowered.

* * * * *